United States Patent
Arai

(10) Patent No.: US 6,724,700 B1
(45) Date of Patent: Apr. 20, 2004

(54) OPTICAL ROTATING RECORDING APPARATUS AND METHOD WITH ADDRESS INFORMATION AND CORRESPONDING ERROR CORRECTION CODE

(75) Inventor: Masayuki Arai, Tokyo (JP)

(73) Assignee: Sony Corporation, Tokyo (JP)

( * ) Notice: Subject to any disclaimer, the term of this patent is extended or adjusted under 35 U.S.C. 154(b) by 112 days.

(21) Appl. No.: 09/688,461

(22) Filed: Oct. 16, 2000

(30) Foreign Application Priority Data

Oct. 29, 1999 (JP) .......................................... P11-310393

(51) Int. Cl.$^7$ ................................................. G11B 5/09
(52) U.S. Cl. ................................... 369/47.14; 369/53.35
(58) Field of Search ........................... 369/275.3, 275.4, 369/47.15, 47.18, 53.12, 53.31, 53.32, 53.35, 53.36, 59.23

(56) References Cited

U.S. PATENT DOCUMENTS

| | | | | |
|---|---|---|---|---|
| 4,800,549 A | * | 1/1989 | Yamagami et al. | 369/53.29 |
| 4,829,497 A | * | 5/1989 | Sako et al. | 369/47.46 |
| 6,047,103 A | * | 4/2000 | Yamauchi et al. | 386/94 |
| 6,091,700 A | * | 7/2000 | Kobayashi | 369/275.3 |
| 6,397,366 B1 | * | 5/2002 | Tanaka et al. | 714/769 |

* cited by examiner

Primary Examiner—Paul W. Huber
(74) Attorney, Agent, or Firm—Oblon, Spivak, McClelland, Maier & Neustadt, P.C.

(57) ABSTRACT

An address information recording region in a header of a land or/and groove on a super compact magneto-optical disk 1 stores one address and an error correction code generated by the Reed-Solomon system corresponding to the address. Preferably, one symbol consists of four bits and the error correction code is generated by the Reed-Solomon system for every four bits.

34 Claims, 8 Drawing Sheets

OPTICAL ROTATING RECORDING APPARATUS AND METHOD WITH ADDRESS INFORMATION AND CORRESPONDING ERROR CORRECTION CODE

BACKGROUND OF THE INVENTION

1. Field of the Invention

The present invention relates to an optical rotating recording medium such as a magneto-optical disk and an optical disk, an address information recording method for recording address information on such an optical rotating recording medium, an address information recovery method for reading and recovering address information from such optical rotating recording medium and an optical reproducing apparatus of the same, and an optical recording/reproducing apparatus.

2. Description of the Related Art

FIG. 1 is a schematic view of a magneto-optical disk.

FIG. 2 is an enlarged view of a part of the magneto-optical disk shown in FIG. 1.

A land and a groove are formed adjacent to each other and are formed continuously in a spiral from the center of the magneto-optical disk toward the outer rim. In the case of the illustrated magneto-optical disk of a CAV format, the land LAND and groove GROOVE are respectively provided with headers HEADER at equivalent angles. Inside the respective headers are recorded address information ADDRESS for indicating their positions.

When compared with recording media like magnetic disks, optical rotating recording media like optical disks and magneto-optical disks suffer from more defects. When a defect arises in the address information, it is no longer possible to access the data recording portion. Thus, the address information is written in the header two times or more to improve the reliability of the address information. Furthermore, an error detecting code is normally added to the address information.

Recently, under circumstances of technological advances such as the achievement of practical blue lasers and improvement of the recording density of magneto-optical disks, super compact, high density, large capacity magneto-optical disks having a diameter of 35 mm to 65 mm and a storage capacity of 2 GB to 4 GB such as described in Japanese Patent Application No. 11-176029 entitled "Optical Medium and Disk Cartridge" filed on Jun. 22, 1999 by the present applicant have been demanded.

If writing address information two or more times in such a super compact magneto-optical disk, the available data writing region decreases by the amount of writing of that redundant address information. Therefore, if the number of times of writing the redundant address information is decreased and the thus obtained region is used for the data writing region, the available data writing region increases.

However, defects also occur in such super compact magneto-optical disks, so if merely decreasing the number of times address information is redundantly written, a problem arises in reliability that data becomes unable to be read due to an unknown address when a defect occurs in the address information.

Such a problem is of course not limited to the above super compact magneto-optical disks and is also a problem to be dealt with for existing optical and magnetic disks.

SUMMARY OF THE INVENTION

A first object of the present invention is to provide an address information recording method capable of reducing a recording region of address information without reducing the reliability and an optical recording apparatus to which the method is applied.

A second object of the present invention is to provide an optical rotating recording medium recorded with address information by such an address information recording method.

A third object of the present invention is to provide an address information recovery method for effectively recovering address information recorded on such an optical recording media and an optical reproducing apparatus wherein the method is applied.

A fourth object of the present invention is to provide an optical recording/reproducing apparatus using said optical rotating recording media.

According to a first aspect of the present invention, there is provided an optical rotating recording medium wherein an address of the position and an error correction code generated for the address are recorded in an address information recording region inside headers of a land and/or groove.

Although there is just one address, since an error correction code having high correcting ability such as an error correction code of a Reed-Solomon system is added, it is possible to decode even if there is a defect. The bit length of the error correction code is shorter than the bit length of the address, so the amount of recording of an address and an error correction code in an optical rotating recording media decreases. As a result, the data recording region becomes larger.

According to a second aspect of the present invention, there is provided a method of recording address information for writing an address corresponding to an address information recording region of a land and/or groove of an optical rotating recording medium, including the steps of generating an error correction code for a corresponding address and recording the one address and a generated error correction code in said address information recording region.

According to a third aspect of the present invention, there is provided an optical recording apparatus comprising an address information generation means for generating an error correction code for each address of a land and/or groove of an optical rotating recording medium and combining one of the addresses and a generated error correction code and a recording means for recording address information generated by said address information generation means in an address information recording region of a land and/or groove on said optical rotating recording medium.

According to a fourth aspect of the present invention, there is provided a method of recovering address information, including the steps of reading one address and a corresponding error correction code recorded in the address information recording region of an optical rotating recording medium recorded with that one address and the error correction code generated for the address information in the address information recording region in a header of the land and/or groove; correcting the read address by the error correction code when there is error in the one read; and treating the correctly corrected address as a normal address and, when not correctly corrected, estimating and outputting a present address from at least one previous correct address in view of the continuity of addresses.

According to a fifth aspect of the present invention, there is provided an optical reproducing apparatus, comprising an optical detection means for reading one address and a corresponding error correction code recorded in the address information recording region of an optical rotating recording medium recorded with that one address and the error correction code generated for the address information in the address information recording region in a header of the land and/or groove and an address information recovery means for correcting any error in the one address detected by said optical detection means by said detected error correction code and using the correctly corrected address as a normal address and for estimating and outputting a present address from at least one previous correct address from the continuity of addresses when not correctly corrected.

Furthermore, according to a sixth aspect of the present invention, there is provided an optical recording/reproducing apparatus, comprising an address information generation means for generating an error correction code for each address of a land and/or groove on an optical rotating recording medium; a recording means for recording one address and a generated error correction code in an address information recording region of a land and/or groove on said optical rotating recording medium; an optical detection means for reading one address and a corresponding error correction code recorded in the address information recording region of an optical rotating recording medium recorded with that one address and the error correction code generated for the address information in the address information recording region in a header of the land and/or groove; an address information recovery means for correcting any error in the one address detected by said optical detection means by said detected error correction code and using the correctly corrected address as a normal address and for estimating and outputting a present address from at least one previous correct address from the continuity of addresses when not correctly corrected.

The optical rotating recording medium, address information recording method, optical recording apparatus, address information recovery method, an optical reproducing apparatus, and an optical recording/reproducing apparatus preferably use an error correction code of the Reed-Solomon system suitable to an optical rotating recording medium as said error correction code.

Preferably, said optical rotating recording medium has a diameter of 38 to 65 mm and a length of one address information recording region of 10 to 100 μm.

For example, said address is 20 to 48 bits and said error correction code is 10 to 20 bits.

Preferably, said error correction code of the Reed-Solomon system is an error correction code generated for every four bits using symbols consisting of four bits. When performing the error correction code processing for every four bits, the distance between codes becomes longer compared with error correction processing for every eight bits and the correction capability declines.

The address information recovery means uses the address read one time previously and recovered without error as said at least one previous correct address.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments will be described with reference to the accompanying drawings.

As an optical rotating recording medium of the present invention, a variety of optical rotating recording media such as magneto-optical disks using an optical and magnetic field, phase change disks, playback only optical disks, CD, etc. using only an optical field are included. They are generally called magneto-optical rotating recording media in the present specification.

In the description below, as an example of an embodiment of the magneto-optical rotating medium of the present invention, the above explained super compact magneto-optical disk capable of recording and reproduction, namely, a super compact high density large capacity magneto-optical disk having a diameter of about 35 mm to 64 mm and a storage capacity of not less than 2 GB, for example attaining 2 GB to 4 GB, will be explained.

Figure 3:
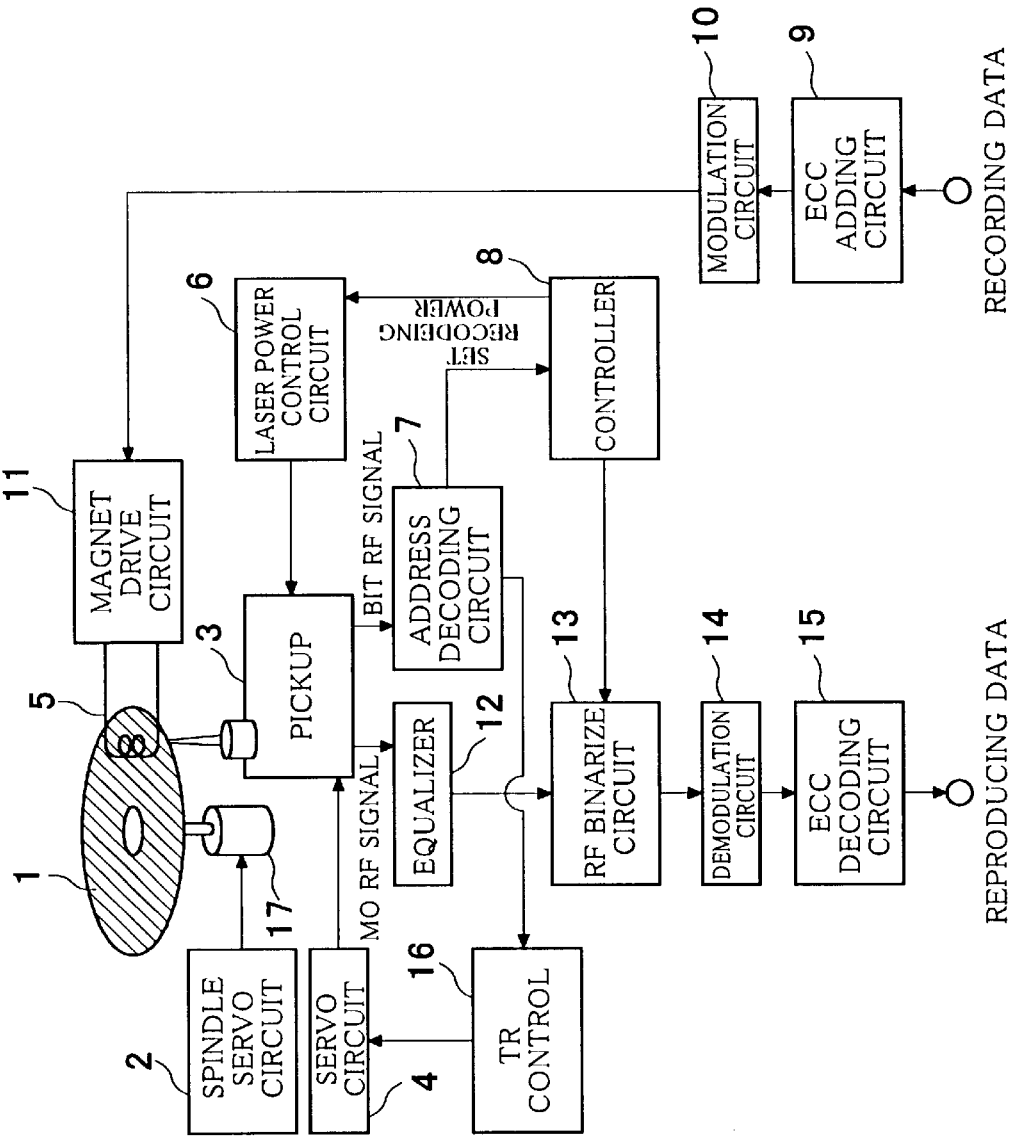
FIG. 3 is a view of a magneto-optical storage/reproducing apparatus for writing data on a magneto-optical disk and an optical storage/reproducing apparatus according to an embodiment of the present invention.

FIG. 3 is a view of the configuration of a magneto-optical recording/reproducing apparatus for writing data from a magneto-optical disk and reading data from the magneto-optical disk according to an embodiment of an optical recording/reproducing apparatus of the present invention.

The magneto-optical recording/reproducing apparatus shown in FIG. 3 records data on a magneto-optical disk 1 such as a super compact magneto-optical disk capable of recording and reproduction as above and reproduces data recorded on the magneto-optical disk 1.

The magneto-optical recording/reproducing apparatus is configured as a combination of a magneto-optical recording apparatus and a magneto-optical reproducing apparatus and comprises as common parts a spindle motor 17, a spindle servo circuit 2 for controlling a spindle motor 17, a pickup 3, a servo circuit 4, an address decoding circuit 7, a tracking control circuit 16, and a controller 8. In the pickup 3, a not shown laser diode, beam splitter, object lens, photo detector, etc. are accommodated.

The parts corresponding to the magneto-optical recording apparatus are an error correction code adding circuit 9, a modulation circuit 10, a magnet drive circuit 11, an external magnetic field generation coil 5, and a laser power control circuit 6.

The parts corresponding to the magneto-optical reproducing apparatus are a laser power control circuit 6, an equalizer 12, an RF signal binarization circuit 13, a data demodulation circuit 14, and a data error correction decoding circuit 15.

The magneto-optical recording/reproducing apparatus shown in FIG. 3 is provided with a tracking control circuit 16, but a focus control circuit is not shown. Namely, in the present embodiment, the pickup 3 is for example a pickup of a flying head mode. A case where focus control is unnecessary because a slider portion mounting an object lens floats a predetermined distance from the magneto-optical disk 1 by air pressure caused by rotation of the magneto-optical disk 1 is described. A pickup which performs focus control is also applicable in the present invention, but whether there is focus control or not is not the issue in the present invention.

The spindle servo circuit 2 controls a rotational speed of the spindle motor so as to rotate the magneto-optical disk 1 at a predetermined rotational speed.

The tracking control circuit 16 positions the pickup 3 via the servo circuit 4 to a position to be recorded on or reproduced from. The position of the pickup 3 is calculated by the address decoding circuit 7 by referring to a detection signal of the photo detector. The operation of the address decoding circuit 7 will be explained in detail later on.

The controller 8 manages a variety of controls in the magneto-optical recording/reproducing apparatus described later.

The external magnetic field generation coil 5 is positioned on a line extending from a laser beam emitted from a laser diode of the pickup 3. The output power of the laser diode of the pickup 3 differs at the time of recording data and at the time of reproducing data. The laser power control circuit 6 controls the power.

The pickup 3 reads for example address information recorded as uneven pits in the magneto-optical disk 1 as a light intensity signal PITRF and decodes the read signal in the address decoding circuit 7. Namely, the address decoding circuit 7 decodes track address information etc. on the super compact magneto-optical disk 1 and sends the position and the address information to the controller 8 and the tracking control circuit 16. The controller 8 controls data recording or data reproduction by referring to the information, while the tracking control circuit 16 controls the positioning of the pickup 3.

The normal data recording operation in a magneto-optical recording/reproducing apparatus will be explained.

At the time of recording data, the controller 8 starts up the tracking control circuit 16. The tracking control circuit 16 controls the servo circuit 4 to make it position the pickup 3 to be a position for data recording. When data to be recorded is input to the error correction code adding circuit 9, an error correction code is added to the data to be recorded there. The data to be recorded to which the error correction code is added is modulated in the modulation circuit 10. The modulation in the modulation circuit 10 is suitably performed in accordance with the type of the magneto-optical disk 1 etc. For example, 16/17 conversion is performed for a super compact magneto-optical disk 1. Other modulation, for example, EFM plus (EFM$^+$) modulation may be performed for DVDs. The magnet drive circuit 11 drives the external magnetic field generation coil 5 so that a magnetic field of a plus or minus polarity is generated on the magneto-optical disk 1 in accordance with the polarity of the data, that is, whether "1" or "0", to be recorded modulated in the modulation circuit 10. At this time, the controller 8 instructs the laser power control circuit 6 to place the laser diode in the pickup 3 in a state capable of driving at a high output where data recording is possible, the laser diode in the pickup 3 is driven in a high output state, and a recording mark in accordance with the polarity of the magnetic field of the external magnetic field generation coil 5 is formed on the recording film of the magneto-optical disk 1 by the high output laser diode beam.

The normal data reproduction operation of a magneto-optical recording/reproducing apparatus will be explained next.

At the time of a data reproduction operation, the controller 8 starts up the tracking control circuit 16. The tracking control circuit 16 controls the servo circuit 4 so as make it position the pickup 3 at a position for data reproduction. An RF signal of a magneto-optical signal (MO signal) recorded on the magneto-optical disk 1 is generated by a detector in the pickup 3, input to the equalizer 12 and subjected to waveform shaping (equalized). An output signal of the equalizer 12 is compared in a binary format in the RF signal binarization circuit 13 and identified as being a digital signal of "1" or "0". The data modulation circuit 14 performs processing reverse to the modulation circuit 10, namely, performs demodulation. The data error correction decoding circuit 15 performs error correction when there is an error in the demodulated digital signal. Thus reproduced data is sent to an outside apparatus such as a host computer.

As a premise of the data recording or data reproducing explained above, it is necessary that the pickup 3 be correctly positioned at a desired position of the magneto-optical disk 1. However, there is a high possibility of loss of data along with scratches or flaws in an optical disk or magneto-optical disk and therefore the reliability of the recording data is low. Thus, multiple recording of an address requiring a high reliability has been performed for improving the reliability in the prior art. In other words, the same address was recorded consecutively two times or more and relief measures taken against partial defects.

Such a method means the ratio of the magneto-optical disk 1 with its limited storage capacity occupied by the address information becomes high, so the substantive storage capacity is decreased. Thus, in the present embodiment, by performing processing improving the reliability of the address information, the bit length of the address information recorded on the magneto-optical disk 1 is made shorter.

Figure 1:
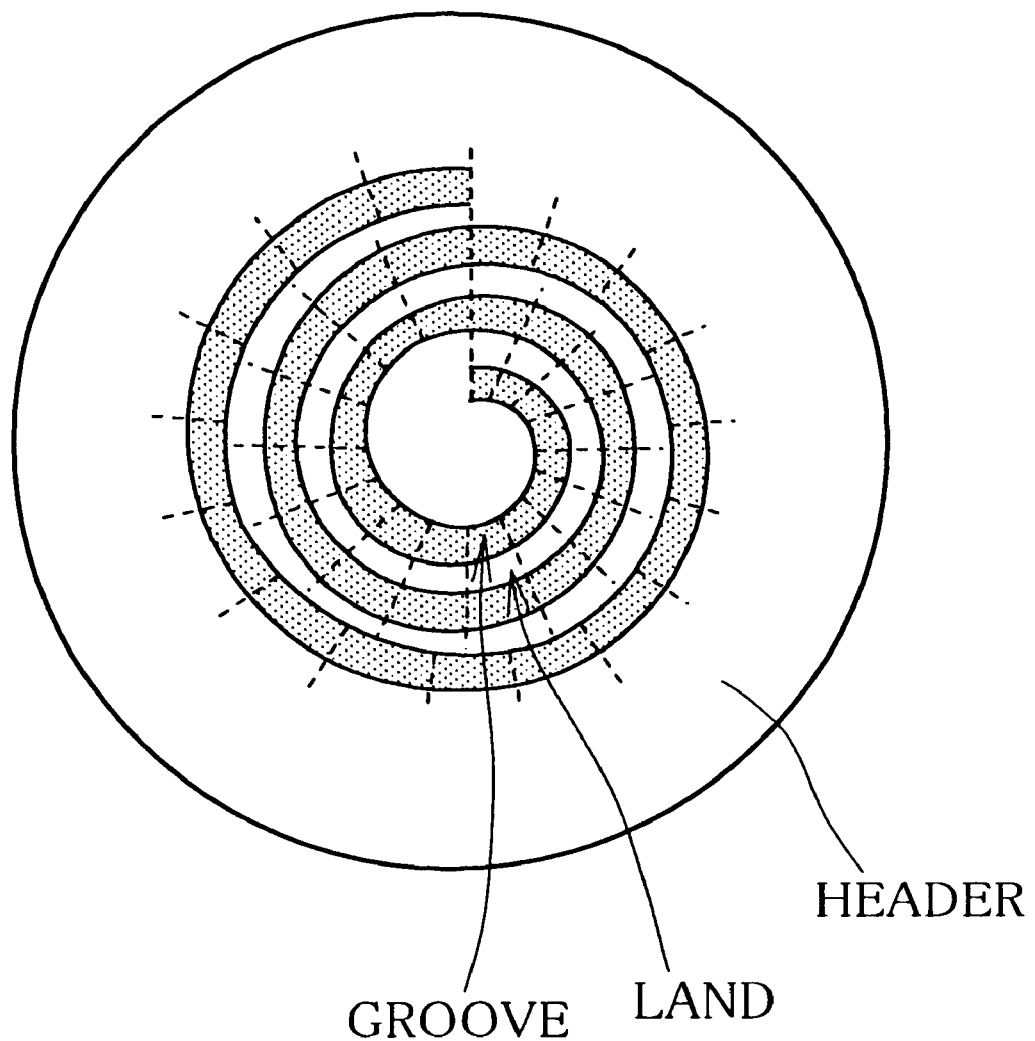
FIG. 1 is a schematic view of a magneto-optical disk.
Figure 2:
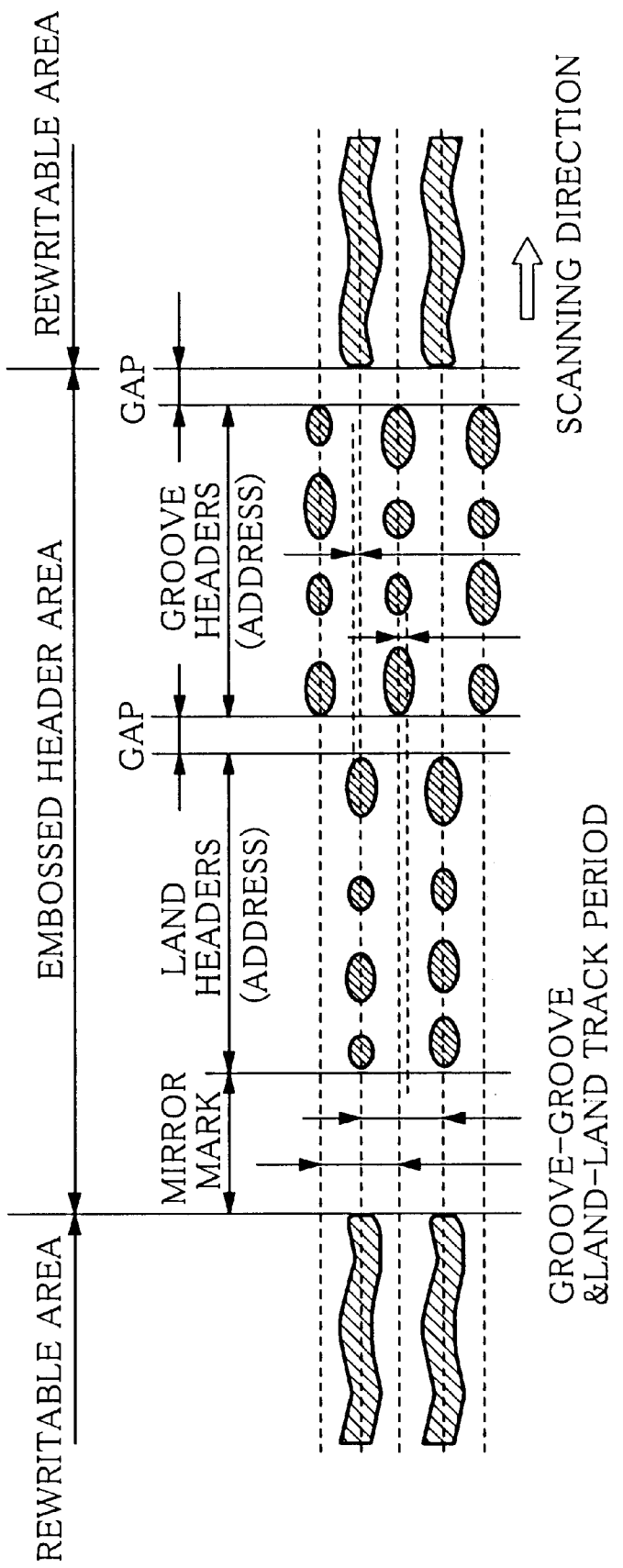
FIG. 2 is a partially enlarged view of the magneto-optical disk shown in FIG. 1.
Figure 4:
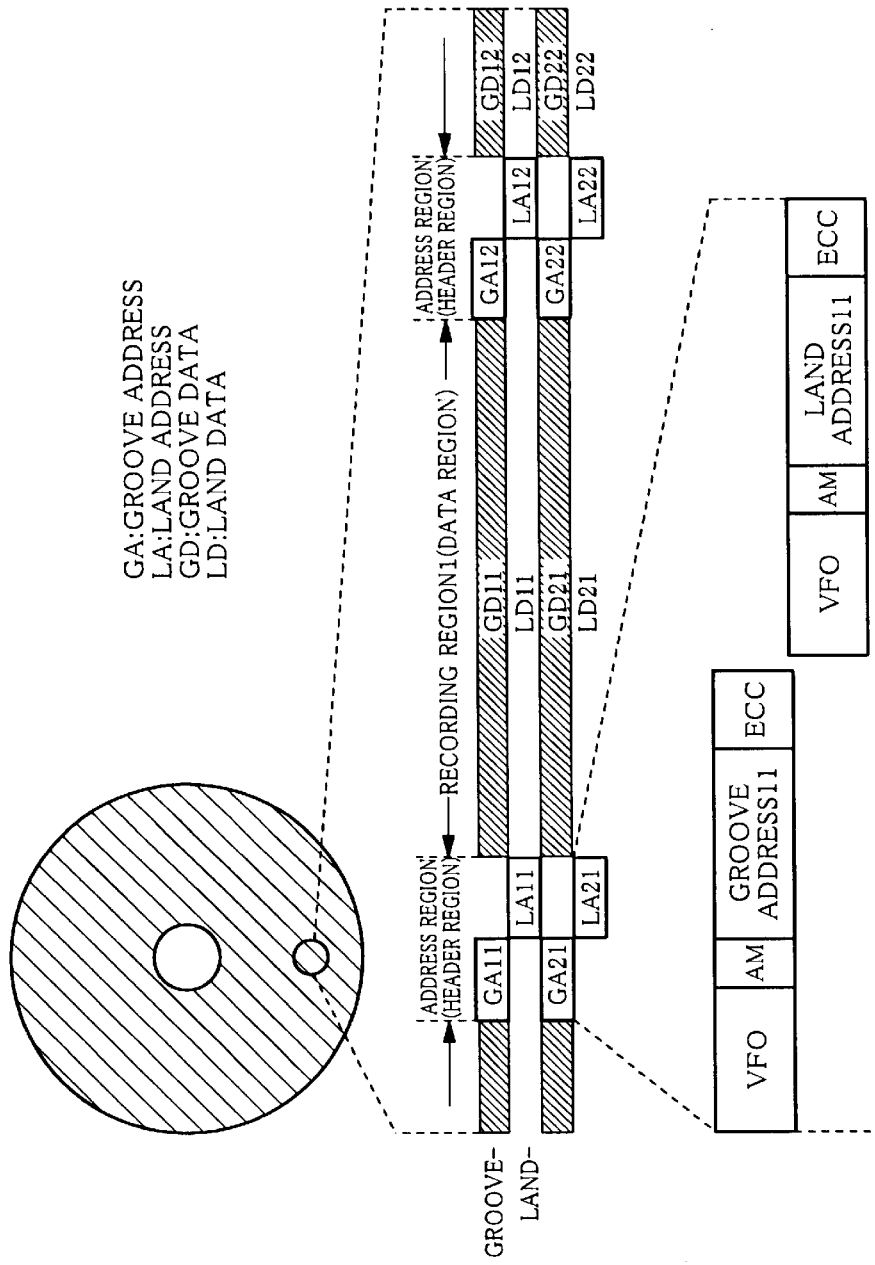
FIG. 4 is a view of a recording region of a magneto-optical disk used in the magneto-optical recording/reproducing apparatus.

FIG. 4 is a view of the relationship of a header region and data region of the magneto-optical disk 1 shown in FIG. 1. In the present embodiment, the case of recording data both on the grooves and lands will be explained. When recording data only on the lands, the following processing is not performed on the grooves.

Since the processing to be performed on the lands and that on the grooves are basically the same, the following description only refers to the lands.

The header region LA11 of the lands is recorded with the VFO comprised of consecutive data for phase locked looping (PLL) to reproduce a clock, an address mark AM, land address data "Land Address 11", and an error correction code ECC.

What should be noted is an error correction code is added to the address data, there is only one address data which is not an error detection code as in the prior art, or a plurality of address data is not recorded consecutively. At least the error correction code ECC is added to the one address data.

Figure 5:
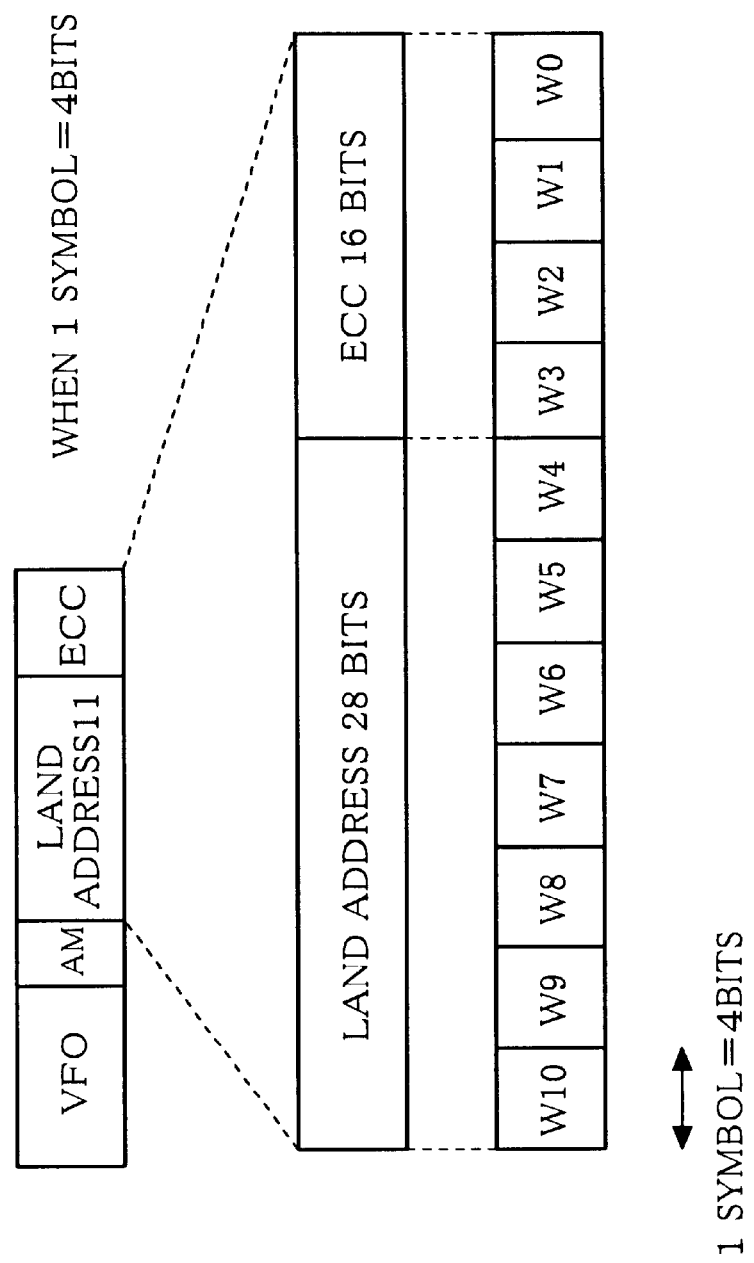
FIG. 5 is a view of an arrangement of addresses and the error correction code according to an embodiment of the present invention.

FIG. 5 is a view of the specific configuration of the land address data "Land Address 11" and the error correction code ECC illustrated in FIG. 4.

As an example of the super compact magneto-optical disk 1 shown in FIG. 3, the land address data "Land Address" is 28 bits and the error correction code ECC is 16 bits for a total of 44 bits. Of course, the error correction code ECC is shorter than the land address data. As a result, the combined bits of the land address data and the error correction code are less than those of two land address data. In the example shown in FIG. 5, when a 28-bit land address data is recorded consecutively two times, it becomes 56 bits, while in the present example, it becomes 44 bits. Thus, the number of bits is reduced to 44/56=78.57%. Since there are a large number of header regions in the magneto-optical disk 1, such a decrease of bits in the address information (combined land address data and error correction code) becomes considerable in the entire magneto-optical disk 1. When this amount is assigned to recording data, the amount of data recorded is increased considerably.

As explained above, when the address information is decreased, the length of a region for recording the address information can be shortened. For example, in the super compact magneto-optical disk 1, the address recording region can be shorten to a range of about 10 μm to 100 μm.

Such an address information recording region is determined by the bit length of the address and that of the error correction code.

Below, a method of generating an error correction code and a method of recording address information which enable such a decrease of the address information will be explained.

There are a variety of means to record such address information on the magneto-optical disk 1. For example, address information can be recorded on a super compact magneto-optical disk 1 by an exclusive address information recording apparatus different from the magneto-optical recording/reproducing apparatus shown in FIG. 3, but in the present embodiment, for convenience, a recording apparatus of the magneto-optical recording/reproducing apparatus shown in FIG. 3, that is, a case of performing it with an error correction code adding circuit 9, a modulation circuit 10, a magnet drive circuit 11, an external magnetic field generation coil 5, a laser power control circuit 6, and a laser diode of a pickup 3 will be explained.

Figure 6:
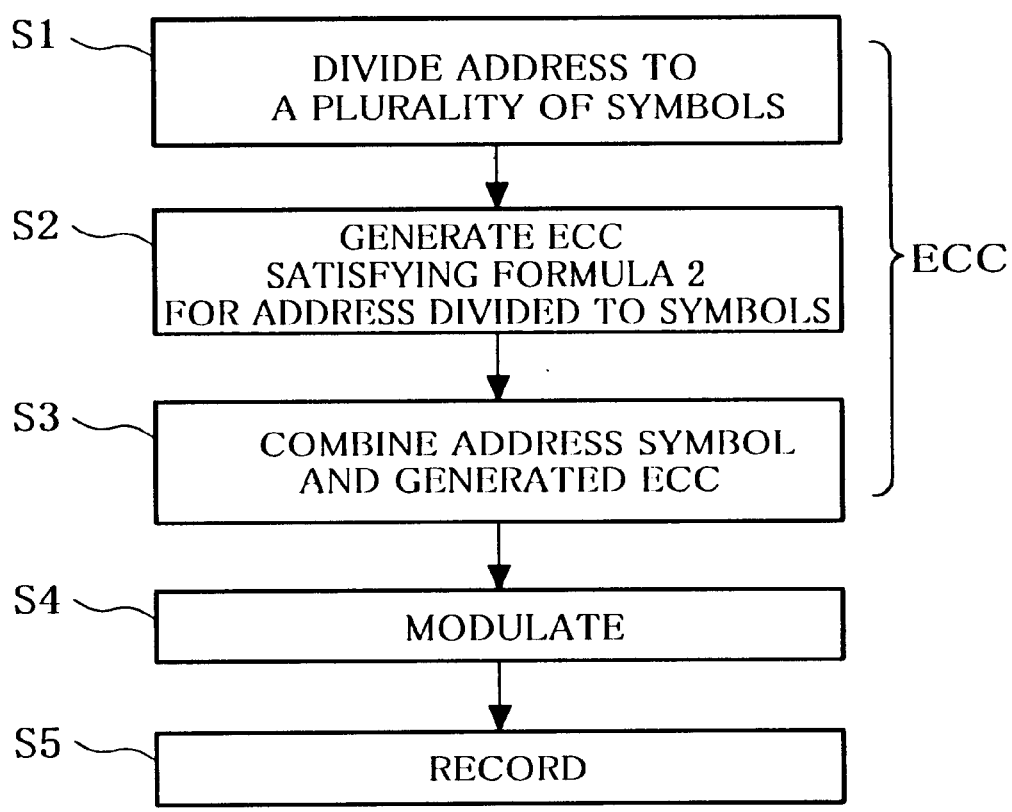
FIG. 6 is a flowchart of a method generating an error correction code for an address.

FIG. 6 is a flow chart of a method of recording address information.

The error correction code adding circuit 9, when receiving a 28-bit land address, divides one symbol to four symbols W1 to W4 (step 1). Then, error correction codes W3 to W0, each of which consists of four bits, is generated by the Reed-Solomon system for the seven symbols (step 2).

The generation of the error correction codes W3 to W0 satisfies the equation (2) below by using a root α of equation (1):

CR $$p(X) = X^4 + X + 1 \quad (1)$$

$$CR \begin{pmatrix} 1 & 1 & \cdots & 1 & 1 \\ \alpha^{10} & \alpha^9 & \cdots & \alpha & 1 \\ \alpha^{20} & \alpha^{18} & \cdots & \alpha^2 & 1 \\ \alpha^{30} & \alpha^{27} & \cdots & \alpha^3 & 1 \end{pmatrix} \begin{pmatrix} W_{10} \\ \vdots \\ W_0 \end{pmatrix} = 0 \quad (2)$$

α indicates a value of a Galois field GF($2^4$) as the primitive polynominal of the equation. The value is shown in Table 1.

TABLE 1

Table of Galois Field GF($2^4$) using p(x) = X4 + X + 1 as Primitive Polynominal $0 = (0000)$
$\alpha^0 = 1 = (0001)$
$\alpha = (0010)$
$\alpha^2 = (0100)$
$\alpha^3 = (1000)$
$\alpha^4 = (0011)$
$\alpha^5 = (0110)$
$\alpha^6 = (1100)$
$\alpha^7 = (1011)$
$\alpha^8 = (0101)$
$\alpha^9 = (1010)$
$\alpha^{10} = (0111)$
$\alpha^{11} = (1110)$
$\alpha^{12} = (1111)$
$\alpha^{13} = (1101)$
$\alpha^{14} = (1001)$
$\alpha^{15} = \alpha^0 = (0001)$ The error correction code of the Reed-Solomon system using symbols consisting of four bits has a long distance of 5 between codes and is able to correct an error of up to 2 symbols among the symbols W10 to W0 and therefore is a (11,7) RS code. Accordingly, correcting error by the Reed-Solomon system using symbols consisting of four bits has a large effect. Particularly, since an address has a bit length of 28 bits, it is sufficient to use symbols consisting of four bits.

Address information is recorded on an optical disk by generating an address and an error correction code corresponding thereto in advance and recording the same by an exclusive address recording apparatus. As the method in that case, the method explained below may be used.

The error correction code adding circuit 9 in the exclusive apparatus not shown generates an error correction code of the Reed-Solomon system, then combines the 28-bit address and 16-bit error correction code ECC (step 3) and sends the result to the modulation circuit not shown.

The modulation circuit not shown modulates the address information (combined address and error correction code) sent from the error correction codes adding circuit 9 in the above modulation format (step 4). The modulated address information is recorded in the address information recording portion in a predetermined header region of the magneto-optical disk 1.

The address information for example as unevenness information recorded in the predetermined header region on the magneto-optical disk 1 has a high error correction capability as explained above, so even if error occurs in two locations, it can be corrected. Accordingly, when adding a 4-bit, that is, 1-symbol error correction code of the Reed-Solomon system by the above explained method, substantially the same effect as obtained by using 56 bits when recording a 28-bit address twice can be obtained by using only 44 bits.

Next, a method of reproducing address information recorded as such will be explained.

A case of decoding the above address information in the address decoding circuit 7 in FIG. 3 will be explained.

Figure 7:
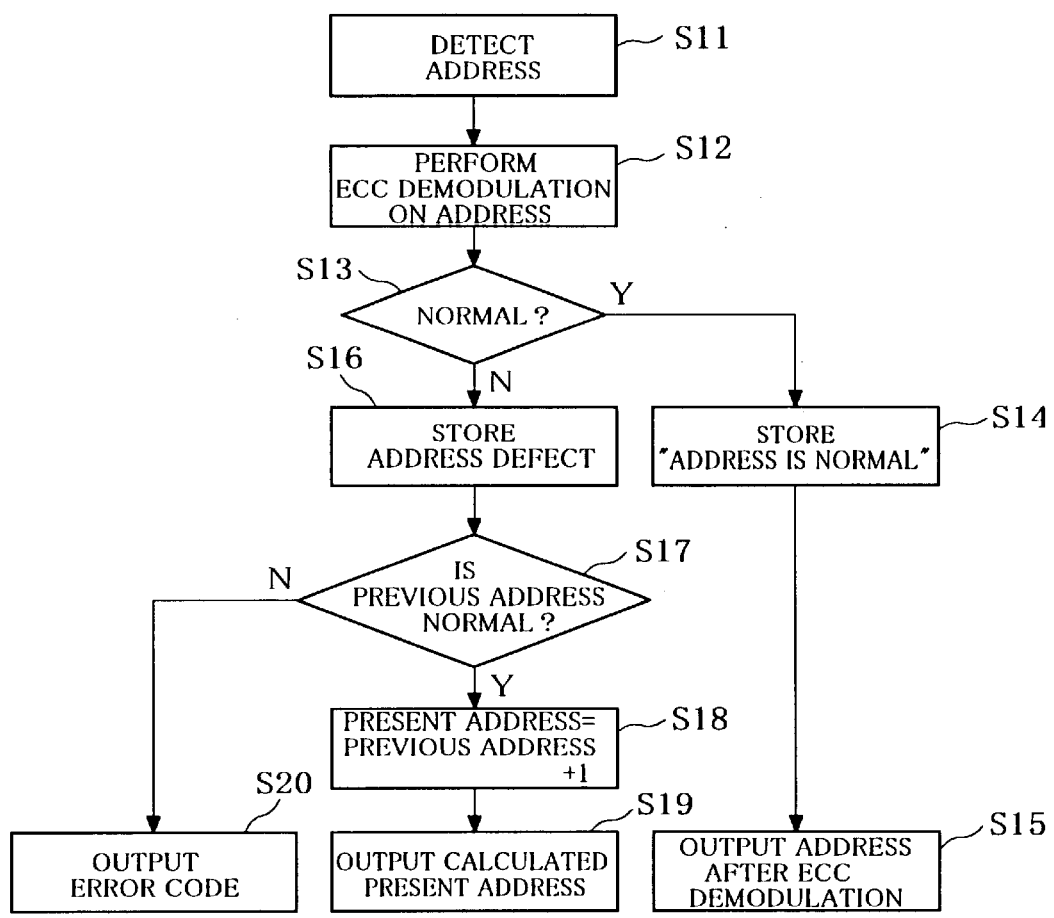
FIG. 7 is a flowchart of a method of decoding an address using error correction.

FIG. 7 is a flowchart of processing in the detector and the address decoding circuit 7 in the pickup 3.

The detector in the pickup 3 detects the address information recorded in the corresponding header region of the above magneto-optical disk 1 (step 11).

The address decoding circuit 7 receives as input the address information detected in the detector in the pickup 3 and judges whether it is normal or not. When it is detected as normal, it stores that the fact that the address is normal without performing error correction processing (step 14) and uses the detected address information for tracking control etc. (step 15).

When an error is detected, the address decoding circuit 7 decodes by the Reed-Solomon system for every four bits (step 12). As explained above, even when an error arises in different two symbols at the same time, they can be corrected. When corrected, the corrected address is stored as a normal address in the same way as the above (step 14) and the corrected address information is used for tracking control etc. (step 15).

Note that the illustration in the flowchart is abbreviated. When an address is detected normally and when corrected normally by the error correction, the same steps 14 and 15 are performed.

When error cannot be corrected even by a 4-bit, 1-symbol Reed-Solomon system (step 13), the address decoding circuit 7 stores the fact that the address information is defective (step 16). Then, the address decoding circuit 7 judges whether the address immediately before that was normal or not (step 17). The case where the address immediately before is normal includes the case where there is no error in the address information detected by the detector and the case where correction was performed by the error correction processing in step 12.

The addresses on the magneto-optical disk 1 are successive. Therefore, when the previous address was normal or when address detection or correction failed, the address decoding circuit 7 updates the present address by one from the previous address based on the continuity of the addresses (step 18) and outputs the updated address as the present address (step 19). By updating an address based on the continuity of addresses in the magneto-optical disk 1 in the above way, for example, even when address information cannot be obtained due to errors in three symbols, the address information can be replicated and therefore the performance of a magneto-optical recording/reproducing apparatus can be improved.

Also, even when the previous address includes error, the address can be updated by twice previous normal address information.

When the previous address detection or error correction fail and address detection or error correction this time also fail, the address decoding circuit 7 outputs an address detection error code to for example the controller 8 (step 20). Note that in this case, as explained above, the present address can be updated by the twice previous normal address information.

As explained above, in the present embodiment, since address information is recorded on the magneto-optical disk 1 by a method having a high error correction capability at the time of recording the address information, even when an error arises in the recorded address, it can be corrected. Furthermore, even in the state where such correction is also difficult, the address is updated by using the continuity of addresses as explained above, so there is the effect of remarkable improvement of the performance of the magneto-optical recording/reproducing apparatus.

First Modification

A Reed-Solomon code is an effective code for byte error correction. Accordingly, Reed-Solomon coding is normally performed for every 8 bits (1 byte) in CDs etc. as well.

Accordingly, in the present embodiment as well, an error correction code can be generated in the error correction code adding circuit 9 for every 8 bits of one symbol by using a generally used Reed-Solomon processing circuit. However, comparing the case of generating an error correction code of the Reed-Solomon format using symbols consisting of 8 bits and the case of generating an error correction code of the Reed-Solomon system using symbols consisting of four bits as explained above, the distance between codes becomes 3 when generating an error correction code of the Reed-Solomon system using symbols consisting of 8 bits (distance between codes becomes 5 when generating an error correction code of the Reed-Solomon system using symbols consisting of four bits), and an error correction capability of errors of two symbols at a time cannot be obtained. Therefore, as an error correction method for relatively short bits of data like an address, use of symbols consisting of four bits is preferable.

In an optical rotating recording medium like a super compact magneto-optical disk 1, effective results were obtained when securing 20 to 48 bits as an address and 10 to 20 bits as an error correction code and when applying an error correction method of the Reed-Solomon system using symbols consisting of four bits.

Second Modification

A method of generating an error correction code and the correction method of the present invention are not limited to the above Reed-Solomon system explained above.

For example, a BCH code etc. are also suitable for random error correction. There are the advantages that the correction capability is high and the code length can be freely determined, thus they may be applied to the present invention as well.

Figure 8:
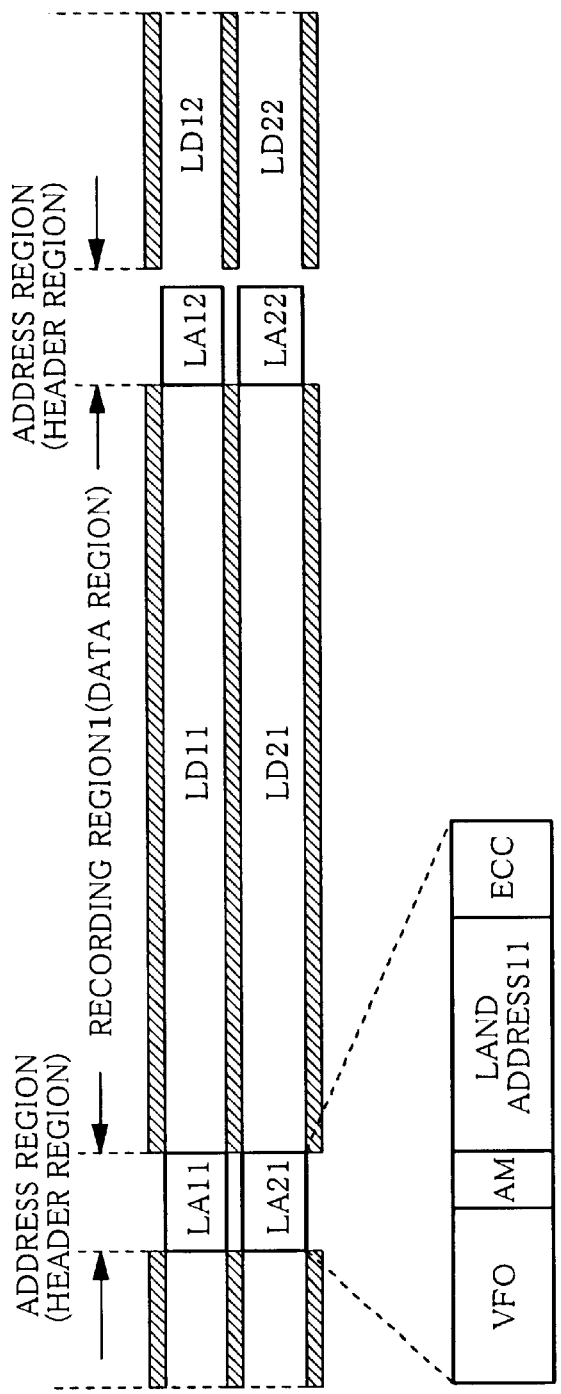
FIG. 8 is a view for explaining a recording region as another example of a magneto-optical disk used in the magneto-optical recording/reproducing apparatus.

FIG. 8 is a view of the internal configuration of a magneto-optical disk when recording address information only on the lands—which differs from the method of recording address information on both the lands and the grooves shown in FIG. 4.

In this way, the address information can be recorded only on the lands or both on the lands and on the grooves.

In the above embodiments, as the magneto-optical disk 1, a super compact magneto-optical disk capable of recording and reproduction, that is, a super compact, high density, large capacity disk having a diameter of about 38 to 65 mm and a storage capacity of at least 2 GB, for example attaining 2 to 4 GB, was described as a representative example, however, a variety of optical rotating recording media such as DVDs, MDs, CDs, and other magneto-optical disks, playback only disks, etc. may be used.

Of course, recording of address information on a playback only disk, unlike the above method, requires generating an address and an error correction code and information data corresponding thereto in advance and recording the same by an address recording apparatus in advance. Note that the method is similar to the above method.

According to the present invention, an address information recording method capable of reducing address information to be recorded without reducing the error correction capability can be provided.

When using the address information recording method of the present invention, the data storage capacity of the optical rotating recording medium is substantially increased.

By applying the address information recovery method of the present invention and the address information recording method of the present invention, even when problems arise in detecting addresses due to defects, the address reproducing capability is improved.

When using the optical rotating recording medium of the present invention and the optical recording/reproducing apparatus of the present invention, the performance of the optical recording/reproducing apparatus is considerably improved.

What is claimed is:

1. An optical rotating recording medium, comprising:
at least one of a land and a groove having an address information recording region in a header,
wherein the header includes only one address and a corresponding error correction code generated for the only one address, and
wherein the optical rotating recording medium includes only one error code corresponding to the address, the only one error code being the generated corresponding error correction code.

2. An optical rotating recording medium as set forth in claim 1, wherein said error correction code is an error code of the Reed-Solomon system.

3. An optical rotating recording medium as set forth in claim 1, wherein said optical rotating recording medium has a diameter of 38 to 65 mm and a length of one address information recording region is 10 to 100 μm.

4. An optical rotating recording medium as set forth in claim 3, wherein said address is 20 to 48 bits and said error correction code is 10 to 20 bits.

5. An optical rotating recording medium as set forth in claim 2, wherein said error correction code of the Reed-Solomon system is an error correction code generated for every four bits using symbols including four bits.

6. A method of recording address information for writing only one address corresponding to an address information recording region of at least one of a land and a groove of an optical rotating recording medium, including the steps of:
generating an error correction code for a corresponding address; and
recording the only one address and said generated error correction code in said address information recording region,
wherein the optical rotating recording medium includes only one error code corresponding to the address, the only one error code being the generated corresponding error correction code.

7. A method of recording address information as set forth in claim 6, wherein in said error correction code generating step, an error correction code of the Reed-Solomon system is generated for a corresponding address.

8. A method of recording address information as set forth in claim 7, wherein said optical rotating recording medium has a diameter of 38 to 65 mm and a length of one address information recording region is 10 to 100 μm.

9. A method of recording address information as set forth in claim 8, wherein said address is 20 to 48 bits and said error correction code is 10 to 20 bits.

10. A method of recording address information as set forth in claim 7, wherein said error correction code of the Reed-Solomon system is an error correction code generated for every four bits using symbols including four bits.

11. A method of recovering address information, including the steps of:
reading one address and a corresponding error correction code recorded in an address information recording region of an optical rotating recording medium recorded with said one address and the error correction code generated for the address information in the address information recording region in a header of at least one of a land and a groove;
correcting the read address by the error correction code when there is an error in the one read address; and
treating the correctly corrected address as a normal address and, when not correctly corrected, estimating and outputting a present address from at least one previous correct address in view of continuity of addresses.

12. A method of recovering address information as set forth in claim 11, further comprising using an address recovered without error read one time before as said at least one previous correct address.

13. A method of recovering address information as set forth in claim 12, wherein
said optical rotating recording medium has a diameter of 38 to 65 mm and a length of one address information recording region is 10 to 100 μm;
said error correction code is an error correction code of the Reed-Solomon system; and
error correction of the Reed-Solomon system is performed in said correction step.

14. An optical recording apparatus, comprising:
an address information generation means for generating an error correction code for each address of at least one of a land and a groove of an optical rotating recording medium and combining one of the addresses and a generated error correction code; and
a recording means for recording a combined address and error correction code in an address information recording region of said at least one of the land and the groove on said optical rotating recording medium,
wherein a header including said address information recording region includes only one address and a corresponding error correction code generated for said only one address, and
wherein the optical rotating recording medium includes only one error code corresponding to the address, the only one error code being the generated corresponding error correction code.

15. An optical recording apparatus as set forth in claim 14, wherein said address information generation means generates an error correction code of the Reed-Solomon system.

16. An optical recording apparatus as set forth in claim 15, wherein said optical rotating recording medium has a diameter of 38 to 65 mm and a length of one address information recording region is 10 to 100 μm.

17. An optical recording apparatus as set forth in claim 16, wherein said address is 20 to 48 bits and said error correction code is 10 to 20 bits.

18. An optical recording apparatus as set forth in claim 15, wherein said error correction code of the Reed-Solomon system is an error correction code generated for every four bits using symbols including four bits.

19. An optical reproducing apparatus, comprising:
an optical detection means for reading one address and a corresponding error correction code recorded in the address information recording region of an optical rotating recording medium recorded with said one address and the error correction code generated for the address information in the address information recording region in a header of at least one of a land and a groove; and
an address information recovery means for correcting any error in the one address detected by said optical detection means by said detected error correction code and using the correctly corrected address as a normal address and for estimating and outputting a present address from at least one previous correct address from the continuity of addresses when not correctly corrected.

20. An optical reproducing apparatus as set forth in claim 19, wherein said address information recovery means uses the address read one time previously and recovered without error as said at least one previous correct address.

21. An optical reproducing apparatus as set forth in claim 20, wherein
said optical rotating recording medium has a diameter of 38 to 65 mm and a length of one address information recording region is 10 to 100 μm, and
said address information recovery means performs error correction of the Reed-Solomon system.

22. An optical recording/reproducing apparatus, comprising:
an address information generation means for generating an error correction code for each address of at least one of a land and a groove on an optical rotating recording medium;
a recording means for recording only one address and a generated error correction code in an address information recording region of said at least one of the land and the groove on said optical rotating recording medium;
an optical detection means for reading said only one address and said corresponding error correction code recorded in the address information recording region of said optical rotating recording medium recorded with said only one address and the error correction code generated for the address information in the address information recording region in a header of the at least one of the land and the groove; and
an address information recovery means for correcting any error in the said only one address detected by said optical detection means by said detected error correction code and using the correctly corrected address as a normal address and for estimating and outputting a present address from at least one previous correct address from the continuity of addresses when not correctly corrected.

23. An optical recording/reproducing apparatus as set forth in claim 22, wherein:
said address information generation means generates an error correction code of the Reed-Solomon system, and
said address information recovery means performs error correction processing of the Reed-Solomon system.

24. An optical recording/reproducing apparatus as set forth in claim 23, wherein said address information recovery means uses an address read one time before and recovered without error as said at least one previous correct address.

25. An optical recording/reproducing apparatus as set forth in claim 24, wherein said optical rotating recording medium has a diameter of 38 to 65 mm and a length of one address information recording region is 10 to 100 μm.

26. An optical recording/reproducing apparatus as set forth in claim 25, wherein said address is 20 to 48 bits and said error correction code is 10 to 20 bits.

27. An optical recording/reproducing apparatus as set forth in claim 23, wherein:
said error correction code of the Reed-Solomon system performed in said address information generation means is an error correction code generated for every four bits using symbols including four bits; and
said error correction of the Reed-Solomon system performed in said address information recovery means is performed for every four bits using symbols including four bits.

28. An optical rotating recording medium recorded with an error correction code generated for an address in an address information recording region in a header of at least one of a land and a groove,
wherein a header including said address information recording region includes only one address and a corresponding error correction code generated for the only one address, and
wherein the optical rotating recording medium includes only one error code corresponding to the address, the only one error code being the generated corresponding error correction code.

29. An optical rotating recording medium as set forth in claim 28, wherein said error correction code is an error correction code of the Reed-Solomon system.

30. An optical rotating recording medium as set forth in claim 29, wherein said error correction code of the Reed-Solomon system is an error correction code generated for every N-bits using symbols including N-bits (N is not more than 8).

31. An optical rotating recording medium as set forth in claim 30, wherein said error correction code of the Reed-Solomon system is an error correction code generated for every four bits using symbols including four bits.

32. An optical recording medium, comprising:
a land or a groove area located on the recording medium; and
a header region recorded in the land or the groove area, said header including address information recording region,
wherein a single address and a corresponding error correction code generated for the single address are recorded in the address information recording region, and
wherein the optical rotating recording medium includes only one error code corresponding to the address, the only one error code being the generated corresponding error correction code.

33. A method of recording address information in an optical recording medium, comprising:
generating an error correction code for a single address written in an address information recording region of a land and/or groove of the optical recording medium; and
recording the single address and the generated error correction code in said address information recording region,
wherein the optical rotating recording medium includes only one error code corresponding to the address, the only one error code being the generated corresponding error correction code.

34. A method of recording information in an optical recording medium, comprising:
generating an error correction code for an address written in an address information recording region of a land and/or groove of the optical recording medium;
combining the address and the generated error correction code; and
recording the combined address and the generated error correction code in said address information recording region,
wherein the optical rotating recording medium includes only one error code corresponding to the address, the only one error code being the generated corresponding error correction code.

* * * * *